(12) United States Patent
Hirokubo

(10) Patent No.: US 11,533,000 B2
(45) Date of Patent: Dec. 20, 2022

(54) ACTUATOR DRIVE APPARATUS AND METHOD FOR CONTROLLING ACTUATOR DRIVE APPARATUS

(71) Applicant: SEIKO EPSON CORPORATION, Tokyo (JP)

(72) Inventor: Nozomu Hirokubo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 199 days.

(21) Appl. No.: 17/106,334

(22) Filed: Nov. 30, 2020

(65) Prior Publication Data

US 2021/0167698 A1 Jun. 3, 2021

(30) Foreign Application Priority Data

Nov. 28, 2019 (JP) .............................. JP2019-215070

(51) Int. Cl.
*G01B 7/14* (2006.01)
*H02N 1/00* (2006.01)
*G01J 3/02* (2006.01)

(52) U.S. Cl.
CPC .............. *H02N 1/006* (2013.01); *G01B 7/14* (2013.01); *G01J 3/0202* (2013.01)

(58) Field of Classification Search
CPC ........ H02N 1/006; H02N 11/00; H02N 1/002; G01B 7/14; G01J 3/0303; G01J 3/26; G02B 26/007
USPC .......................................... 310/309; 318/116
See application file for complete search history.

(56) References Cited

U.S. PATENT DOCUMENTS

| 6,930,487 | B2* | 8/2005 | North, Jr. ............... | H02N 1/006 |
| | | | | 73/514.12 |
| 7,751,173 | B2* | 7/2010 | Ikehashi ............. | H01H 59/0009 |
| | | | | 361/277 |
| 9,389,350 | B2* | 7/2016 | Hirokubo ................. | G01J 3/26 |
| 9,547,166 | B2* | 1/2017 | Kuri .......................... | G02B 5/00 |
| 9,910,262 | B2* | 3/2018 | Hirokubo ................. | G05B 6/02 |
| 10,473,912 | B2* | 11/2019 | Nozawa .................... | G01J 3/26 |
| 10,670,856 | B2* | 6/2020 | Kuri ..................... | G02B 26/001 |
| 2013/0308134 | A1 | 11/2013 | Hirokubo | |
| 2015/0346479 | A1* | 12/2015 | Hirokubo ................. | G01J 3/26 |
| | | | | 359/578 |

FOREIGN PATENT DOCUMENTS

| EP | 2664947 | * 11/2013 | .............. G02B 5/28 |
| JP | H0194312 A | 4/1989 | |

(Continued)

*Primary Examiner* — Burton S Mullins
(74) *Attorney, Agent, or Firm* — Chip Law Group

(57) ABSTRACT

An actuator drive apparatus according to a first aspect includes a first member, a second member that faces the first member via a gap, a gap sensor that detects a dimension of the gap, a first actuator that changes the dimension of the gap through input of a first voltage signal, and a second actuator that changes the dimension of the gap through input of a second voltage signal, in which the first voltage signal is a voltage signal that becomes a constant bias voltage after a lapse of a predetermined time, and includes an overshoot signal larger than the bias voltage before the lapse of the predetermined time, and the second voltage signal is a voltage signal that is feedback-controlled so that a detection value detected by the gap sensor approaches a target value.

6 Claims, 5 Drawing Sheets

(56) References Cited

FOREIGN PATENT DOCUMENTS

| JP | 2013182143 | * | 9/2013 | ............. | G02B 26/06 |
| JP | 2013238755 A | | 11/2013 | | |
| JP | 2014126758 | * | 7/2014 | ............. | G02B 26/02 |
| JP | 2018155950 | * | 10/2018 | ............. | G02B 26/00 |

* cited by examiner

ACTUATOR DRIVE APPARATUS AND METHOD FOR CONTROLLING ACTUATOR DRIVE APPARATUS

The present application is based on, and claims priority from JP Application Serial Number 2019-215070, filed Nov. 28, 2019, the disclosure of which is hereby incorporated by reference herein in its all.

BACKGROUND

1. Technical Field

The present disclosure relates to an actuator drive apparatus and a method for controlling the actuator drive apparatus.

2. Related Art

In the related art, there is known an actuator drive apparatus including an actuator that changes a distance between a pair of members and a control portion that controls the actuator so that the distance between the pair of members reaches a target value (for example, see JP-A-1-94312). For example, the actuator drive apparatus described in JP-A-1-94312 is a variable interference apparatus that includes a pair of substrates facing each other, in which a reflective film is provided in each of the surfaces of the substrates facing each other. In addition, this variable interference apparatus includes electrodes for detecting electrostatic capacitance in the surfaces of the respective substrates facing each other, and the electrostatic capacitance can be detected by an electrostatic capacitance detection circuit. Further, the variable interference apparatus includes an actuator that moves one of the pair of substrates back and forth toward the other. In such a variable interference apparatus, a control circuit for controlling the actuator performs feedback-control of the voltage applied to the actuator based on the electrostatic capacitance detected by the electrostatic capacitance detection circuit. Thereby, the dimension between a pair of reflective films can be controlled to be a target value.

However, in the actuator drive apparatus as described in JP-A-1-94312, the responsiveness and the disturbance suppression have a trade-off relationship, and when the responsiveness is improved, the disturbance suppression decreases, and when the disturbance suppression is improved, the responsiveness decreases. That is, in the actuator apparatus, when a voltage is applied to the actuator, the member displaced by the actuator vibrates. At this time, by performing feedback-control of the voltage applied to the actuator based on the electrostatic capacitance detected by the electrostatic capacitance detection circuit, it is possible to suppress the vibration and set the distance between the members to the target value. Here, in order to more quickly match the distance between the members with the target value, the setting of the control circuit is set with emphasis on the responsiveness. As a result, the voltage applied to the actuator during the feedback-control is controlled to increase. On the other hand, when disturbance vibration is applied to the actuator apparatus, the control circuit functions to perform feedback-control of the actuator to converge the vibration. However, when the responsiveness is emphasized as described above, an excessive control voltage may be applied for the feedback-control with respect to a slight disturbance vibration, and it takes time until the vibration converges, and the disturbance suppression decreases. On the contrary, when the setting of the control circuit is set with emphasis on the disturbance suppression, the responsiveness decreases, and it takes a long time until the distance between the members reaches the target value.

SUMMARY

An actuator drive apparatus according to a first aspect of the present disclosure, includes a first member, a second member that faces the first member via a gap, a gap sensor that detects a dimension of the gap, a first actuator that changes the dimension of the gap through input of a first voltage signal, and a second actuator that changes the dimension of the gap through input of a second voltage signal, in which the first voltage signal is a voltage signal that becomes a constant bias voltage after a lapse of a predetermined time, and includes an overshoot signal larger than the bias voltage before the lapse of the predetermined time, and the second voltage signal is a voltage signal that is feedback-controlled so that a detection value detected by the gap sensor approaches a target value.

A method for controlling an actuator drive apparatus according to a second aspect of the present disclosure is a method for controlling an actuator drive apparatus including a first member, a second member that faces the first member via a gap, a gap sensor that detects a dimension of the gap, a first actuator that changes the dimension of the gap through input of a first voltage signal, and a second actuator that changes the dimension of the gap through input of a second voltage signal, the method including a first voltage application step of applying the first voltage signal to the first actuator, and a second voltage application step of applying the second voltage signal to the second actuator, in which the first voltage signal applied in the first voltage application step is a voltage signal that becomes a constant bias voltage after a lapse of a predetermined time, and includes an overshoot signal larger than the bias voltage before the lapse of the predetermined time, and the second voltage signal applied in the second voltage application step is a voltage signal that is feedback-controlled so that a detection value detected by the gap sensor approaches a target value.

DESCRIPTION OF EXEMPLARY EMBODIMENTS

Figure 1:
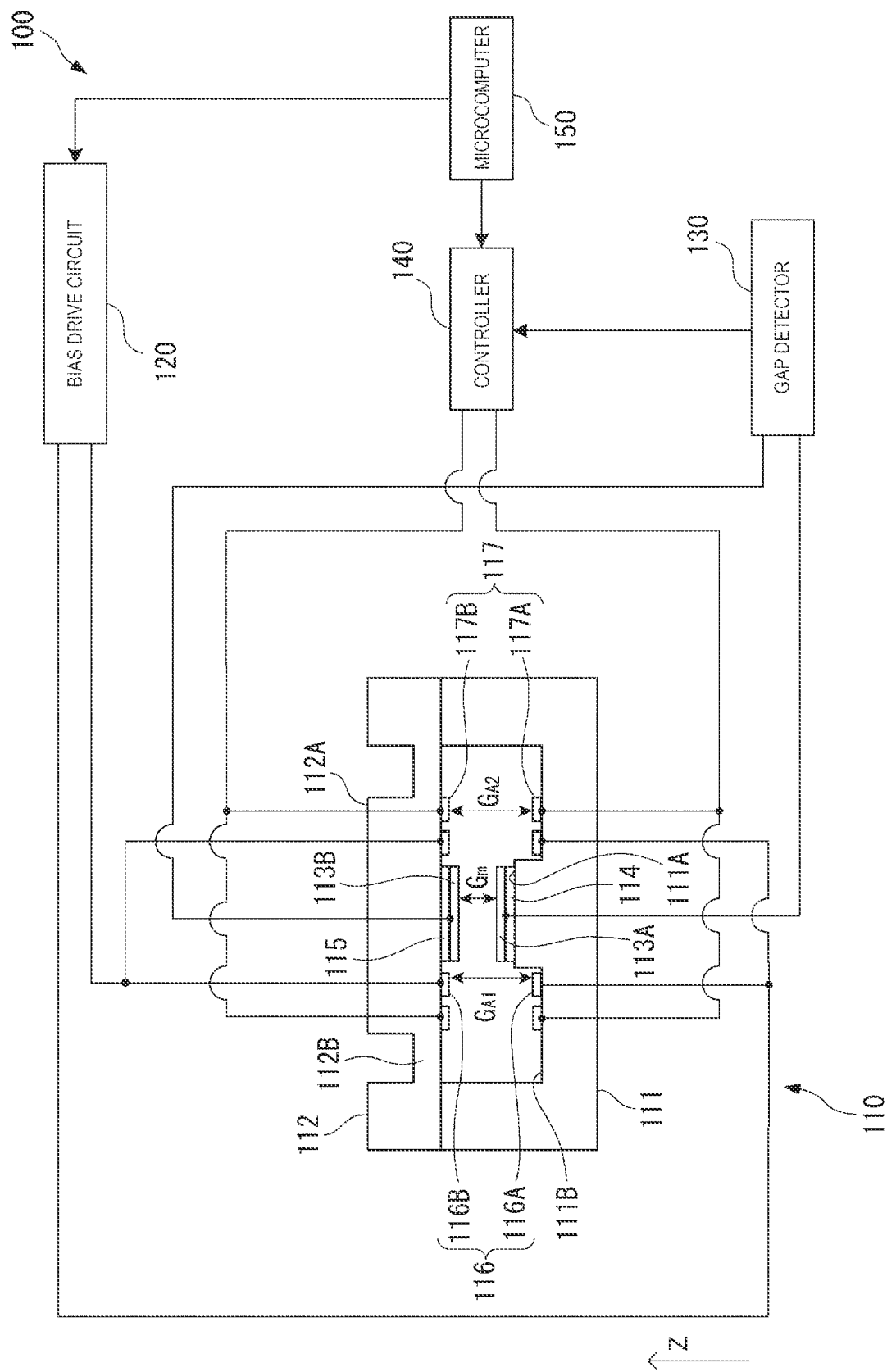
FIG. 1 is a schematic diagram showing a schematic configuration of a spectroscopic apparatus according to an embodiment of the present disclosure.

A spectroscopic apparatus according to an embodiment will be described below. FIG. 1 is a schematic diagram showing a schematic configuration of a spectroscopic apparatus 100 of the present embodiment.

Overall Configuration of Spectroscopic Apparatus 100

The spectroscopic apparatus 100 is an example of an actuator drive apparatus, and is an apparatus that disperses and outputs light having a desired target wavelength from incident light. As shown in FIG. 1, the spectroscopic apparatus 100 includes an interference filter 110, a bias drive circuit 120, a gap detector 130, a controller 140, and a microcomputer 150. Hereinafter, each configuration will be described in detail.

Configuration of Interference Filter 110

As shown in FIG. 1, the interference filter 110 includes a light-transmitting first substrate 111 and a second substrate 112. The first substrate 111 corresponds to a first member, and the second substrate 112 corresponds to a second member. The first substrate 111 and the second substrate 112 are bonded to each other by a bonding film such as a plasma-polymerized film containing siloxane as a main component to be integrally configured. In the following description, the direction from the first substrate 111 toward the second substrate 112 is a Z direction. The Z direction is a direction orthogonal to the light incident surface and the light emitting surface of the interference filter 110.

A concave portion formed by etching or the like is provided in the surface of the first substrate 111 facing the second substrate 112, and the concave portion causes the first substrate 111 and the second substrate 112 to face each other via a gap. Specifically, the concave portion provided in the first substrate 111 includes a first concave portion 111A and a second concave portion 111B surrounding the first concave portion 111A. In the example shown in FIG. 1, the surface of the first concave portion 111A facing the second substrate 112 is located closer to the second substrate 112 than the surface of the second concave portion 111B facing the second substrate 112, but the present disclosure is not limited thereto. For example, the surface of the first concave portion 111A facing the second substrate 112 may be separated from the second substrate 112 than the surface of the second concave portion 111B facing the second substrate 112. Alternatively, the surface of the first concave portion 111A facing the second substrate 112 may be flush with the surface of the second concave portion 111B facing the second substrate 112. Further, in the present embodiment, an example in which a gap is formed between the first substrate 111 and the second substrate 112 due to the concave portion of the first substrate 111 is shown, but for example, a spacer may be provided between the first substrate 111 and the second substrate 112, and a gap may be formed depending on the thickness of the spacer. The gap between the first substrate 111 and the second substrate 112 in the present embodiment includes a mirror gap $G_m$ between a first reflective film 114 and a second reflective film 115, a first actuator gap $G_{A1}$ between a first electrode 116A and a second electrode 116B, and a second actuator gap $G_{A2}$ between a third electrode 117A and a fourth electrode 117B, which will be described later.

The first substrate 111 includes the first reflective film 114 in the surface of the first concave portion 111A facing the second substrate 112. The first reflective film 114 may be configured with a metal film or a metal alloy film, or may be configured with a dielectric multilayer film. In the surface of the first reflective film 114, a first capacitance electrode 113A configured with a light-transmitting electrode such as ITO is provided.

Further, the first substrate 111 is provided with the first electrode 116A in the surface of the second concave portion 111B facing the second substrate 112. The first electrode 116A is disposed so as to surround the first reflective film 114 and is insulated from the first capacitance electrode 113A. The first electrode 116A faces the second electrode 116B provided in the second substrate 112 via the first actuator gap $G_{A1}$. The first electrode 116A and the second electrode 116B constitute an electrostatic actuator (the first actuator 116) that changes the dimension of the mirror gap $G_m$ between the first reflective film 114 and the second reflective film 115 by electrostatic attraction when a voltage is applied.

Further, the first substrate 111 is provided with a third electrode 117A insulated from the first capacitance electrode 113A and the first electrode 116A in the surface of the second concave portion 111B facing the second substrate 112. The third electrode 117A is disposed so as to surround the first electrode 116A and faces the fourth electrode 117B provided in the second substrate 112 via the second actuator gap $G_{A2}$. The third electrode 117A and the fourth electrode 117B constitute an electrostatic actuator (the second actuator 117) that changes the dimension of the mirror gap $G_m$ between the first reflective film 114 and the second reflective film 115 by electrostatic attraction when a voltage is applied.

An annular groove is provided in the surface of the second substrate 112 opposite to the first substrate 111, whereby the second substrate 112 is configured to include a movable portion 112A that is an inner side of the annular groove and a diaphragm portion 112B that is a bottom surface of the groove. The second reflective film 115 is provided in the surface of the movable portion 112A facing the first substrate 111. The second reflective film 115 faces the first reflective film 114 provided in the first substrate 111 via the mirror gap $G_m$. The second reflective film 115 is made of the same material as the first reflective film 114, and is configured with, for example, a metal film, a metal alloy film, or a dielectric multilayer film. Further, a second capacitance electrode 113B is provided in the surface of the second reflective film 115 facing the first reflective film 114.

Further, at least one of the movable portion 112A and the diaphragm portion 112B of the second substrate 112 is provided with the second electrode 116B facing the first electrode 116A and insulated from the second capacitance electrode 113B. The second electrode 116B constitutes a first actuator 116 together with the first electrode 116A. Further, at least one of the movable portion 112A and the diaphragm portion 112B of the second substrate 112 is provided with the fourth electrode 117B facing the third electrode 117A and insulated from the second electrode 116B. The fourth electrode 117B constitutes a second actuator 117 together with the third electrode 117A.

The interference filter 110 as described above functions as a wavelength-variable Fabry-Perot etalon element, and when a voltage is applied to the first actuator 116 and the second actuator 117, electrostatic attraction acts between the electrodes to displace the movable portion 112A toward the first substrate 111 side. This makes it possible to change the dimension of the mirror gap $G_m$. Here, in the present embodiment, by applying the bias voltage from the bias drive circuit 120 to the first actuator 116, the movable portion 112A is largely displaced so that the dimension of the mirror gap $G_m$ is close to the target value. Further, by applying the control voltage from the controller 140 to the second actuator 117, the movable portion 112A is feedback-controlled so that the dimension of the mirror gap $G_m$ matches the target value. As a result, the mirror gap $G_m$ between the first reflective film 114 and the second reflective film 115 becomes a target value corresponding to a target wavelength, and the interference filter 110 outputs light having the target wavelength.

Configuration of Bias Drive Circuit 120

Figure 2:
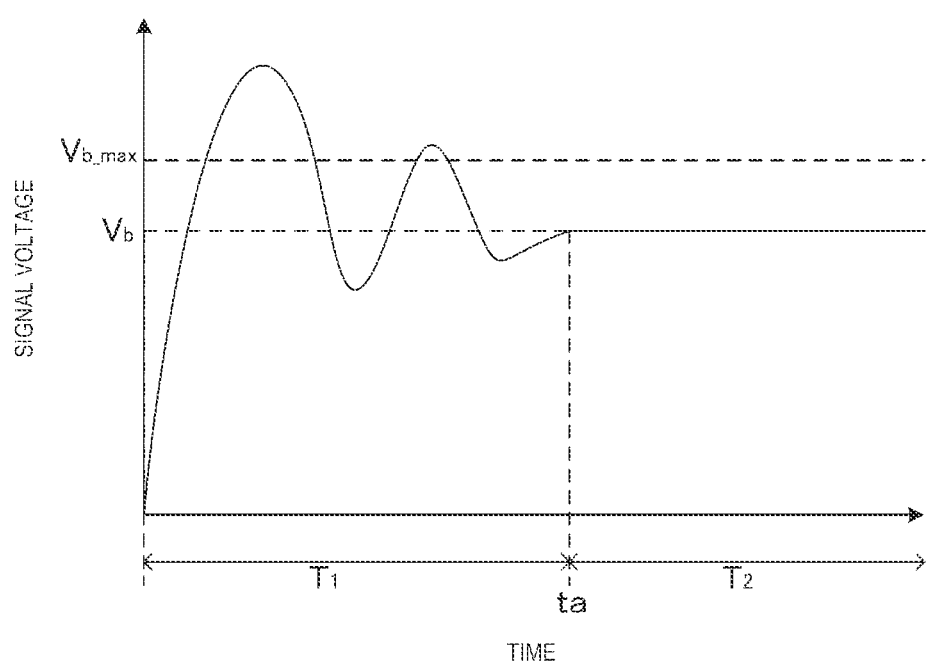
FIG. 2 is a diagram showing an example of a signal waveform of a first voltage signal applied from a bias drive circuit to a first actuator in the present embodiment.

FIG. 2 is a diagram showing an example of a signal waveform of the first voltage signal applied from the bias drive circuit 120 to the first actuator 116 in the present embodiment. The bias drive circuit 120 applies a first voltage signal to the first actuator 116 based on the control of the microcomputer 150. As shown in FIG. 2, the first voltage signal is a voltage signal that includes an overshoot signal that exceeds a bias voltage $V_b$ during the voltage transition period $T_1$ from the application start timing of the first voltage signal before a lapse of a predetermined time (stabilization time ta). During a voltage maintaining period $T_2$ after that lapse of the stabilization time ta, the first voltage signal is maintained at a constant bias voltage $V_b$.

Here, in the present embodiment, the first actuator 116 largely displaces the movable portion 112A so that the mirror gap $G_m$ becomes less than the target value according to the target wavelength, and the remaining minute adjustment is performed by the second actuator 117. Therefore, when the second actuator 117 is not used and only the first actuator 116 is used to set the mirror gap $G_m$ to a dimension according to the target wavelength, the bias voltage $V_b$ applied to the first actuator 116 is smaller than the voltage applied to the first actuator 116 (hereinafter, referred to as a maximum bias voltage $V_{b\_max}$). Here, the maximum bias voltage $V_{b\_max}$ has a value represented by the following Equation (1).

$$V_{b\_max} = \sqrt{\frac{2K_1(G_0 - G_t)G_t^2}{ES}} \quad (1)$$

In Equation (1), S is an area where the first electrode 116A and the second electrode 116B face each other, that is, the area where the first electrode 116A and the second electrode 116B overlap each other when viewed from the Z direction. $K_1$ is the spring coefficient of the diaphragm portion 112B of the second substrate 112, and E is the dielectric constant between the first electrode 116A and the second electrode 116B. $G_0$ is the initial dimension of the first actuator gap $G_{A1}$ when no voltage is applied to the first actuator 116 and the second actuator 117. $G_t$ is a target dimension of the first actuator gap $G_{A1}$ and is a dimension determined by the target wavelength of the light transmitted from the interference filter 110. The area S, the dielectric constant E, the spring coefficient $K_1$, and the initial dimension $G_0$ of the first actuator gap $G_{A1}$ are known values. On the other hand, the dimension $G_t$ of the first actuator gap $G_{A1}$ corresponding to the target wavelength changes depending on the target wavelength to be set.

The difference between the maximum bias voltage $V_{b\_max}$ and the bias voltage $V_b$ is set based on the performance of the controller 140. That is, the bias drive circuit 120 sets the bias voltage $V_b$ based on the maximum bias voltage $V_{b\_max}$ and the voltage range of the control voltage applied to the second actuator 117 by the controller 140 and applies the bias voltage $V_b$ to the first actuator 116. For example, when the maximum voltage that can be output by the controller 140 is $V_{c\_max}$, the bias drive circuit 120 applies the bias voltage $V_b$ to the first actuator 116 such that $V_b = V_{b\_max} - (V_{c\_max}/2)$.

Regarding the setting of the bias voltage $V_b$, the bias drive circuit 120 sets the bias voltage $V_b$ based on the bias command signal input from the microcomputer 150. For example, when the bias command signal includes the dimension $G_t$ of the first actuator gap $G_{A1}$ corresponding to the target wavelength, the bias drive circuit 120 calculates the maximum bias voltage $V_{b\_max}$ based on the target command signal, further the bias voltage $v_b$ can be set. Further, the bias command signal input from the microcomputer 150 may include the maximum bias voltage $V_{b\_max}$, and in this case, the bias drive circuit 120 may set the bias voltage $V_b$ based on the maximum bias voltage $V_{b\_max}$. Alternatively, the bias command signal input from the microcomputer 150 may include the bias voltage $V_b$ corresponding to the target wavelength, and in this case, the bias drive circuit 120 may use the bias voltage $V_b$ included in the target command signal.

As shown in FIG. 2, the signal waveform of the first voltage signal output from the bias drive circuit 120 during the voltage transition period $T_1$ has a signal waveform including an overshoot signal. The overshoot signal is a voltage signal whose voltage peak is larger than the bias voltage $V_b$ and the maximum bias voltage $V_{b\_max}$. The number of overshoot signals included in the first voltage signal is not particularly limited, and may be one or plural as shown in FIG. 2. Further, the signal waveform of the first voltage signal during the voltage transition period $T_1$ is set based on the natural period of the second substrate 112, and has a waveform that cancels the natural vibration of the movable portion 112A due to the spring property of the diaphragm portion 112B. Specifically, when the transfer function of the interference filter 110 is G, a first voltage signal having a transfer function of 1/G is applied to the first actuator 116. Accordingly, the vibration of the movable portion 112A can quickly converge so that the first actuator gap $G_{A1}$ has the target dimension $G_t$.

Configuration of Gap Detector 130

The gap detector 130 is electrically coupled to the first capacitance electrode 113A and the second capacitance electrode 113B, and constitutes a gap sensor together with the first capacitance electrode 113A and the second capacitance electrode 113B. The gap detector 130 is a capacitance detection circuit that detects the capacitance of the first capacitance electrode 113A and the second capacitance electrode 113B. Since the capacitances of the first capacitance electrode 113A and the second capacitance electrode 113B are inversely proportional to the dimension of the mirror gap $G_m$, the capacitances of the first capacitance electrode 113A and the second capacitance electrode 113B and the dimension of the mirror gap $G_m$ have a one-to-one correspondence. Therefore, detecting the capacitance means detecting the dimension of the mirror gap $G_m$ between the first reflective film 114 and the second reflective film 115. The thickness of the first reflective film 114, the second reflective film 115, the first electrode 116A, the second electrode 116B, the third electrode 117A, and the fourth electrode 117B, the groove depth of the first concave portion 111A and the second concave portion 111B, and the dimension and spring coefficient of the diaphragm portion 112B are known. Therefore, the dimensions of the first actuator gap $G_{A1}$ and the second actuator gap $G_{A2}$ can be calculated by detecting the dimensions of the mirror gap $G_m$.

Configuration of Controller 140

The controller 140 is coupled to the gap detector 130 and the microcomputer 150. Then, the controller 140 applies a second voltage signal to the second actuator 117 to perform feedback-control so that the mirror gap $G_m$ has a dimension corresponding to the target wavelength. That is, the controller 140 applies, as the second voltage signal, a control voltage based on a difference signal between the target command signal indicating the target wavelength input from the microcomputer 150 and the detection signal input from the gap detector 130 to the second actuator 117. As a result, the dimension of the mirror gap $G_m$ is adjusted so that the spectral wavelength of the light passing through the interference filter 110 becomes the target wavelength indicated by the target command signal. The controller 140 may be an analog controller that outputs the second voltage signal as an analog signal, or may be a digital controller that outputs the second voltage signal as a digital signal. When using a digital controller, the controller 140 may be integrated with the microcomputer 150.

Configuration of Microcomputer 150

The microcomputer 150 includes an arithmetic circuit and a storage circuit, and controls the entire operation of the spectroscopic apparatus 100. The microcomputer 150 is coupled to an interface (not shown) that couples the spectroscopic apparatus 100 and an external apparatus, and can also receive a signal from an external apparatus. The signal from the external apparatus may be, for example, a signal specifying a target wavelength of light to be dispersed by the spectroscopic apparatus 100. The spectroscopic apparatus 100 may be configured to include an operation portion that receives an input operation by a user, and in this case, an operation signal from the operation portion is input to the microcomputer 150. The microcomputer 150 outputs the bias command signal corresponding to the target wavelength to the bias drive circuit 120 and outputs the target command signal to the controller 140 by the arithmetic circuit reading and executing the program stored in the storage circuit.

Operation in Spectroscopic Apparatus 100

Figure 3:
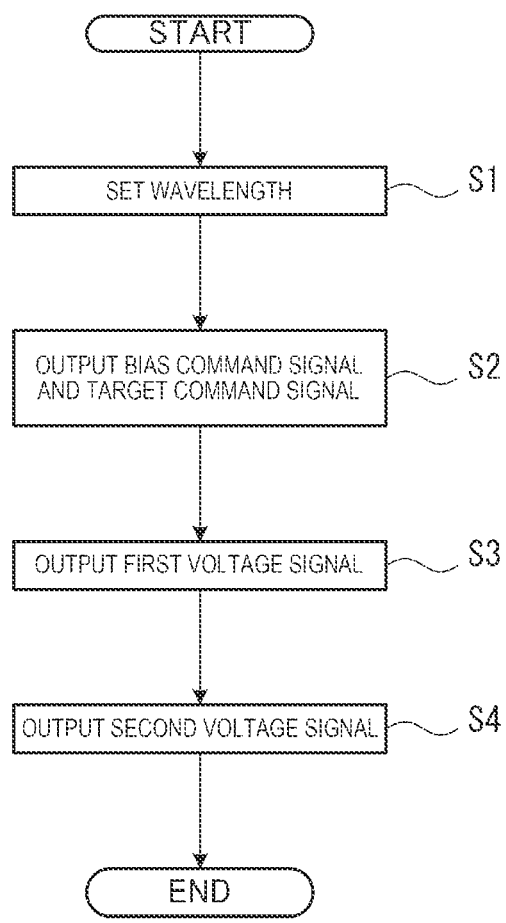
FIG. 3 is a flowchart showing a control method of the spectroscopic apparatus of the present embodiment.

Next, a control method of the spectroscopic apparatus 100 will be described. FIG. 3 is a flowchart showing a control method of the spectroscopic apparatus 100 of the present embodiment. When the spectroscopic apparatus 100 performs spectroscopic processing, first, the microcomputer 150 sets a target wavelength (step S1). For example, the microcomputer 150 may set the target wavelength acquired from an external apparatus, or may set the target wavelength input from the operation portion. Further, when setting the spectral wavelength of each wavelength at predetermined wavelength intervals, the microcomputer 150 sets a preset target wavelength and executes the processing of steps S2 to S4 described later, and then returns to step S1 again, sets the target wavelength, and repeats the spectroscopic processing. As a result, it is possible to sequentially output light having each wavelength at predetermined intervals.

Next, the microcomputer 150 outputs a bias command signal corresponding to the target wavelength to the bias drive circuit 120 and a target command signal corresponding to the target wavelength to the controller 140 (step S2). Thereby, upon receiving the target command signal, the bias drive circuit 120 applies a first voltage signal corresponding to the target wavelength to the first actuator 116 (step S3: first voltage application step). That is, the bias drive circuit 120 cancels the natural vibration of the movable portion 112A during the voltage transition period $T_1$ from the application start timing to the stabilization time ta, and applies the first voltage signal including an overshoot signal larger than the bias voltage $V_b$ to the first actuator 116. Further, after the lapse of the stabilization time ta, the bias drive circuit 120 applies the first voltage signal that is maintained at a constant bias voltage $V_b$ to the first actuator 116 during the voltage maintaining period $T_2$. At the same time as step S3, the controller 140 applies a second voltage signal to the second actuator 117 based on the detection signal and the target command signal input from the gap detector 130 to perform feedback-control (step S4: second voltage application step).

Figure 4:
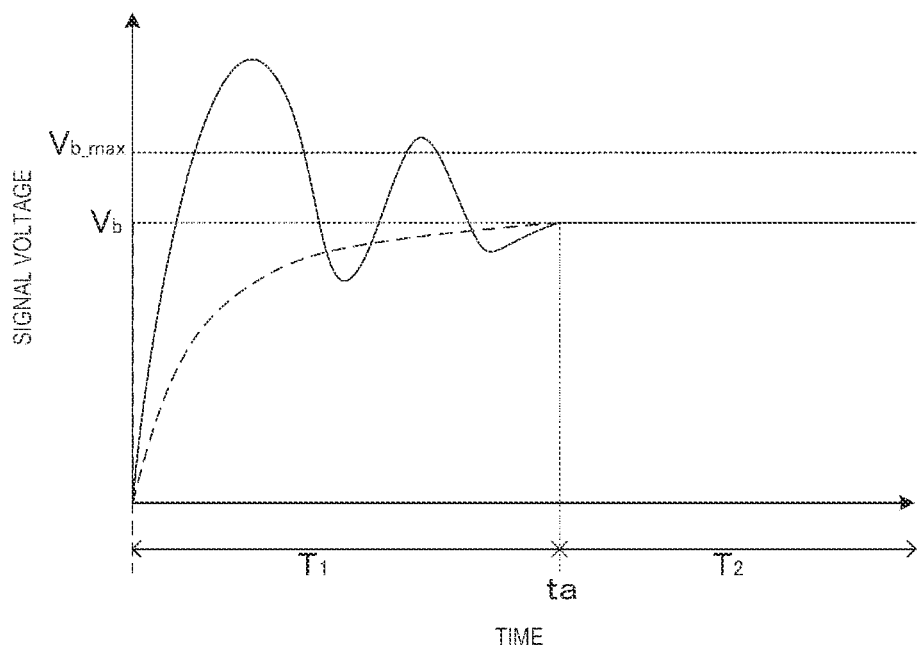
FIG. 4 is a diagram showing an example of a first voltage signal applied to the first actuator and an example of a bias voltage signal of a comparative example in the present embodiment.
Figure 5:
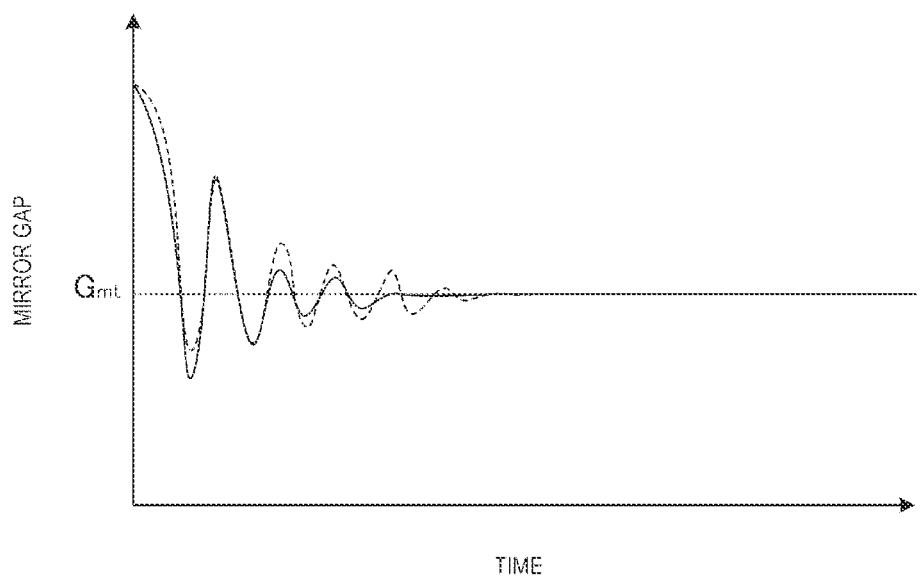
FIG. 5 is a diagram showing an example of changes in a mirror gap in the present embodiment and the comparative example.

FIG. 4 is a diagram showing an example of a first voltage signal applied to the first actuator 116 and an example of a bias voltage signal of a comparative example in the present embodiment. In FIG. 4, the solid line shows the first voltage signal of the present embodiment, and the broken line shows the bias voltage signal of Comparative Example 1. FIG. 5 is a diagram showing an example of changes in the mirror gap $G_m$. The solid line is an example when the first voltage signal of the present embodiment is applied to the first actuator 116, and the broken line is an example when the bias voltage signal of Comparative Example 1 is applied to the first actuator 116.

The signal waveform of the bias voltage signal of the comparative example is a temporary delay curve, and in this case, the movable portion 112A can be displaced while suppressing the vibration of the movable portion 112A. However, although the vibration of the movable portion 112A can be reduced, the vibration cannot be completely suppressed. By applying the second voltage signal to the second actuator 117 from the controller 140 optimized for disturbance suppression, the vibration of the movable portion 112A can be suppressed, but it takes a long time to set the mirror gap $G_m$ to the target value. Here, it is conceivable to reduce the time constant of the bias voltage signal in order to improve the responsiveness. However, in this case, the vibration of the movable portion 112A becomes large and the time until the vibration converges becomes long, and therefore the responsiveness cannot be sufficiently improved. It is also possible to use the controller 140 optimized for responsiveness to converge the vibration due to the second voltage signal applied to the second actuator 117 to enhance the responsiveness. However, in this case, the disturbance suppression decreases. That is, in order to improve the responsiveness, the controller 140 needs to apply a large electrostatic attraction to the second actuator 117 so that the mirror gap $G_m$ reaches a desired target value and the variation converges faster. However, when the controller 140 is optimized so that the responsiveness is improved, even when the movable portion 112A slightly vibrates due to disturbance vibration, a large electrostatic attraction acts on the second actuator 117. In this case, the convergence of the disturbance vibration may be delayed, or the disturbance vibration may not converge but may diverge. Therefore, when the bias voltage signal shown in the comparative example is applied to the first actuator 116, it is difficult to achieve both the responsiveness and the disturbance suppression.

On the other hand, in the present embodiment, the mirror gap $G_m$ converges to a target value $G_{mt}$ more quickly than when the bias voltage signal of the comparative example is applied to the first actuator 116. This is because the first voltage signal includes an overshoot signal, and therefore the responsiveness is improved, and a voltage signal having a cycle that cancels the natural vibration of the movable portion 112A is applied even when the movable portion 112A vibrates. Further, by applying the first voltage signal to the first actuator 116, the responsiveness when setting the mirror gap $G_m$ to the target value $G_{mt}$ can be improved, and therefore the controller 140 that applies the second voltage signal to the second actuator 117 can be optimized for the disturbance suppression. Therefore, in the present embodiment, it is possible to achieve both the responsiveness and the disturbance suppression when driving the interference filter 110.

Operational Effect of the Present Embodiment

The spectroscopic apparatus 100 of the present embodiment includes an interference filter 110, a bias drive circuit 120, a gap detector 130, and a controller 140. The interference filter 110 includes a first substrate 111 and a second substrate 112 that faces the first substrate 111 via a gap. The first substrate 111 includes the first reflective film 114 having the first capacitance electrode 113A provided in the surface thereof, and the second substrate 112 includes the second reflective film 115 having the second capacitance electrode 113B provided in the surface thereof, whereby the first capacitance electrode 113A and the second capacitance electrode 113B face each other via the mirror gap $G_m$. Then, the gap detector 130 detects the dimension of the mirror gap $G_m$ according to the electrostatic capacitance between the first capacitance electrode 113A and the second capacitance electrode 113B. The interference filter 110 also includes the first actuator 116 and the second actuator 117. The first actuator 116 is coupled to the bias drive circuit 120 and receives the first voltage signal. The second actuator 117 is coupled to the controller 140 and receives the second voltage signal. The bias drive circuit 120 includes, as the first voltage signal, an overshoot signal larger than the bias voltage $V_b$ during the voltage transition period $T_1$ from the application start timing before the lapse of the stabilization time ta, and outputs a voltage signal that is maintained at a constant bias voltage $V_b$ in the voltage maintaining period $T_2$ after the lapse of the stabilization time ta. Further, the controller 140 outputs, as the second voltage signal, a voltage signal that is feedback-controlled so that the detection value detected by the gap detector 130 approaches the target value corresponding to the target wavelength.

In such a configuration, during the voltage transition period $T_1$, by applying the first voltage signal including the overshoot signal to the first actuator 116, the mirror gap $G_m$ can be swiftly made to have a dimension corresponding to the target wavelength, and the responsiveness of the spectroscopic apparatus 100 can be improved. Further, since the responsiveness can be improved by the first voltage signal output from the bias drive circuit 120, the controller 140 that applies the second voltage signal to the second actuator 117 can be designed to be optimized for the disturbance suppression. As a result, it is possible to achieve both the responsiveness and the disturbance suppression of the spectroscopic apparatus 100.

In the spectroscopic apparatus 100 of the present embodiment, the first actuator 116 is an electrostatic actuator that includes the first electrode 116A provided in the first substrate 111 and the second electrode 116B that is provided in the second substrate 112 and faces the first electrode 116A via the first actuator gap $G_{A1}$. Further, the second actuator 117 is an electrostatic actuator that includes the third electrode 117A provided in the first substrate 111 and the fourth electrode 117B that is provided in the second substrate 112 and faces the third electrode 117A via the second actuator gap $G_{A2}$. Then, the first actuator 116 and the second actuator 117 displace the movable portion 112A of the second substrate 112 toward the first substrate 111 by bending the diaphragm portion 112B of the second substrate 112. In such a configuration, the actuator can be configured with a simple configuration in which electrodes are formed in the surfaces of the first substrate 111 and the second substrate 112 that face each other, and the configuration of the interference filter 110 can be simplified. Further, in the electrostatic actuator, the electrostatic attraction is inversely proportional to the dimension of the gap between the electrodes, and therefore, the smaller the dimension between the first substrate 111 and the second substrate 112, the more difficult the control becomes. On the other hand, in the present embodiment, by applying the first voltage signal including the bias voltage to the first actuator 116 and applying the second voltage signal including the control voltage to the second actuator 117, the dimension between the first substrate 111 and the second substrate 112 can be controlled with high accuracy.

In the spectroscopic apparatus 100 of the present embodiment, the bias drive circuit 120 applies the bias voltage $V_b$, smaller than the maximum bias voltage $V_{b\_max}$ shown in Equation (1) to the first actuator 116. When outputting the light having the target wavelength from the interference filter 110, the maximum bias voltage $V_{b\_max}$ represented by Equation (1) is a voltage that sets the mirror gap $G_m$ to the dimension according to the target wavelength only by the first actuator 116. Therefore, by setting the bias voltage $V_b$ to $V_b < V_{b\_max}$, the first actuator 116 can largely displace the movable portion 112A so that the mirror gap $G_m$ becomes close to the target value according to the target wavelength, by the second actuator 117, the mirror gap $G_m$ can be finely adjusted, and the mirror gap $G_m$ can be set to the target value $G_{mt}$ according to the target wavelength with high accuracy.

In the present embodiment, the first voltage signal has a signal waveform that includes the overshoot signal that is output during the voltage transition period $T_1$ and that cancels the natural vibration of the movable portion 112A. Accordingly, by applying the overshoot signal to the first actuator 116, even when the movable portion 112A vibrates, the electrostatic attraction of the first actuator 116 is controlled so as to suppress the vibration. As a result, the responsiveness of the spectroscopic apparatus 100 can be further improved, and the light having the desired target wavelength can be quickly transmitted from the interference filter 110.

MODIFICATION EXAMPLE

The present disclosure is not limited to the above-described embodiment, and modifications, improvements, and the like within the scope of achieving the object of the present disclosure are included in the present disclosure.

Modification Example 1

Figure 6:
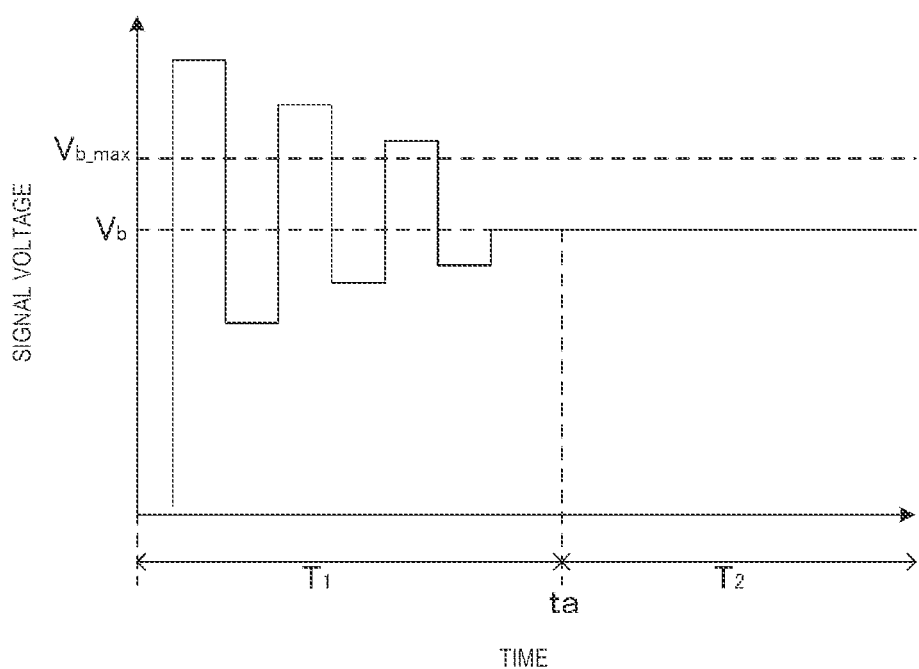
FIG. 6 is a diagram showing an example of a first voltage signal according to Modification Example 1.

In the above embodiment, the analog signal as shown in FIG. 2 is illustrated as the first voltage signal, but the present disclosure is not limited thereto. FIG. 6 is a diagram illustrating an example of a signal waveform of the first voltage signal according to Modification Example 1. The bias drive circuit 120 may output a digital signal (rectangular wave) as shown in FIG. 6 as the first voltage signal. Even in this case, similarly to the above-described embodiment, it is possible to achieve both the responsiveness and the disturbance suppression of the spectroscopic apparatus 100.

Modification Example 2

In the above embodiment, electrostatic actuators are illustrated as the first actuator 116 and the second actuator 117, but the present disclosure is not limited thereto. For example, the first actuator 116 and the second actuator 117 may be configured to displace a piezoelectric body by applying a voltage to the piezoelectric body and change the gap between the first substrate 111 that is a first member and the second substrate 112 that is a second member. In addition, the gap may be changed by using the drive force of the motor, or the gap may be changed by using fluid pressure such as air pressure.

Modification Example 3

In the above embodiment, the bias drive circuit 120 applies the first voltage signal to the first actuator 116, and at the same time, performs feedback-control based on the detection value of the gap detector 130 by the controller 140, but the present disclosure is not limited thereto. For example, the controller 140 may apply the second voltage signal to the second actuator 117 during the voltage maintaining period 12 after the lapse of the stabilization time ta.

Modification Example 4

In the above embodiment, the spectroscopic apparatus 100 is illustrated as an actuator drive apparatus, but the present disclosure is not limited thereto. The actuator drive apparatus has a first member and a second member that are disposed to face each other via a gap, and can be applied to any apparatus that changes the dimension of the gap by the first actuator and the second actuator. Examples of such an actuator drive apparatus include a MEMS element such as a mirror device, a hard disk drive, and the like. When the present disclosure is applied to a mirror device, the mirror device is configured such that the substrate which is the first member, and the mirror portion which is the second member, are disposed to face each other via a gap, and the mirror device is provided with a gap sensor that detects the gap between the substrate and the mirror portion, and a first actuator and a second actuator that changes the gap between the substrate and the mirror portion. Then, when the dimension of the gap between the substrate and the mirror portion is set to a desired target value, a first voltage signal including an overshoot voltage during the voltage transition period $T_1$ and having a constant bias voltage during the voltage maintaining period $T_2$ is applied to the first actuator. Further, feedback-control is performed by applying a second voltage signal to the second actuator based on the difference between the value detected by the gap sensor and the target value. This makes it possible to achieve both the responsiveness and the disturbance suppression of the mirror device. When the present disclosure is applied to a hard disk drive, the hard disk drive includes a magnetic disk that is a first member, a magnetic head that is a second member, a first actuator and a second actuator that change the dimension between the magnetic disk and the magnetic head, and a gap sensor that detects the gap between magnetic disk and magnetic head. Then, the first voltage signal is applied to the first actuator, and the second voltage signal, which is the feedback-control voltage based on the detection value of the gap sensor, is applied to the second actuator. This makes it possible to achieve both the responsiveness and the disturbance suppression of the hard disk drive.

Overview of the Disclosure

An actuator drive apparatus according to a first aspect includes a first member, a second member that faces the first member via a gap, a gap sensor that detects a dimension of the gap, a first actuator that changes the dimension of the gap through input of a first voltage signal, and a second actuator that changes the dimension of the gap through input of a second voltage signal, in which the first voltage signal is a voltage signal that becomes a constant bias voltage after a lapse of a predetermined time, and includes an overshoot signal larger than the bias voltage before the lapse of the predetermined time, and the second voltage signal is a voltage signal that is feedback-controlled so that a detection value detected by the gap sensor approaches a target value.

In this way, by applying the first voltage signal including an overshoot signal to the first actuator, the dimension of the gap between the first member and the second member can be quickly brought close to the target value, and the responsiveness can be improved. Further, since the responsiveness can be improved by applying the first voltage signal to the first actuator, the second voltage signal applied to the second actuator can be a voltage signal optimized for disturbance suppression. This makes it possible to achieve both the responsiveness and the disturbance suppression of the actuator drive apparatus.

In the actuator drive apparatus according to the present aspect, it is preferable that the first actuator is an electrostatic actuator including a first electrode provided in the first member and a second electrode provided in the second member and facing the first electrode, the second actuator is an electrostatic actuator including a third electrode provided in the first member and a fourth electrode provided in the second member and facing the third electrode, and the first actuator and the second actuator change the dimension of the gap by bending the second member toward the first member.

As described above, by constituting the first actuator and the second actuator with electrostatic actuators, the configuration of the actuator drive apparatus can be simplified.

In the actuator drive apparatus according to the present aspect, it is preferable that when a spring coefficient of the second member is $K_1$, a dielectric constant of the gap is E, a target value of a dimension between the first electrode and the second electrode of the first actuator is $G_t$, the dimension between the first electrode and the second electrode is $G_0$ when the first actuator and the second actuator are not driven, and an area of a region where the first electrode and the second electrode overlap when viewed in a direction from the first member toward the second member is S, the bias voltage is smaller than a maximum bias voltage $V_{b\_max}$ represented by the following Equation (1).

$$V_{b\_max} = \sqrt{\frac{2K_1(G_0 - G_t)G_t^2}{ES}} \quad (1)$$

The maximum bias voltage $V_{b\_max}$ represented by Equation (1) is a voltage when the gap between the first member and the second member is set to a desired target value by only the first actuator. Accordingly, by setting the bias voltage $V_b$ of the first voltage signal to $V_b < V_{b\_max}$, the first actuator can make coarse adjustment and control the gap between the first member and the second member so as to be close to the target value. Further, the second actuator can finely adjust the gap based on the detection value of the gap sensor. Thereby, the gap between the first member and the second member can be accurately set to a desired target value.

In the actuator drive apparatus according to the present aspect, it is preferable that the first voltage signal output before the lapse of the predetermined time has a signal waveform that is set according to the natural period of the second member and that cancels the natural vibration of the second member.

As a result, even when the second member is displaced by the first actuator and the natural vibration is generated in the second member, the first actuator to which the first voltage signal is applied can generate stress so as to cancel the natural vibration of the second member, and the vibration of the second member can quickly converge.

In the actuator drive apparatus according to the present aspect, it is preferable that the first member includes a first reflective film in the surface facing the second member, and the second member includes a second reflective film facing the first reflective film in the surface facing the first member. In the present aspect, the actuator drive apparatus can function as a Fabry-Perot etalon element (interference filter). In such a Fabry-Perot etalon element, in order to transmit or reflect the light having the target wavelength from the incident light, it is necessary to control the gap between the first reflective film and the second reflective film with high accuracy, and it is also necessary to suppress fluctuations in the gap rather than disturbance vibration. On the other hand, in the present aspect, the gap between the reflective films of the Fabry-Perot etalon element can be controlled with high responsiveness and high accuracy, and the disturbance suppression can be improved.

A method for controlling an actuator drive apparatus according to a second aspect is a method for controlling an actuator drive apparatus including a first member, a second member that faces the first member via a gap, a gap sensor that detects a dimension of the gap, a first actuator that changes the dimension of the gap through input of a first voltage signal, and a second actuator that changes the dimension of the gap through input of a second voltage signal, the method including a first voltage application step of applying the first voltage signal to the first actuator, and a second voltage application step of applying the second voltage signal to the second actuator, in which the first voltage signal applied in the first voltage application step is a voltage signal that becomes a constant bias voltage after a lapse of a predetermined time, and includes an overshoot signal larger than the bias voltage before the lapse of the predetermined time, and the second voltage signal applied in the second voltage application step is a voltage signal that is feedback-controlled so that a detection value detected by the gap sensor approaches a target value. As a result, as in the first aspect, by applying the first voltage signal including an overshoot signal to the first actuator, the dimension of the gap between the first member and the second member can be quickly brought close to the target value, and the responsiveness can be improved. Further, since the responsiveness can be improved by applying the first voltage signal to the first actuator, the second voltage signal applied to the second actuator can be a voltage signal optimized for disturbance suppression. This makes it possible to achieve both the responsiveness and the disturbance suppression of the actuator drive apparatus.

What is claimed is:

1. An actuator drive apparatus comprising:
a first member;
a second member that faces the first member via a gap;
a gap sensor that detects a dimension of the gap;
a first actuator that changes the dimension of the gap through input of a first voltage signal; and
a second actuator that changes the dimension of the gap through input of a second voltage signal, wherein
the first voltage signal is a voltage signal that becomes a constant bias voltage after a lapse of a predetermined time, and includes an overshoot signal larger than the bias voltage before the lapse of the predetermined time, and
the second voltage signal is a voltage signal that is feedback-controlled so that a detection value detected by the gap sensor approaches a target value.

2. The actuator drive apparatus according to claim 1, wherein
the first actuator is an electrostatic actuator including a first electrode provided in the first member, and a second electrode provided in the second member and facing the first electrode,
the second actuator is an electrostatic actuator including a third electrode provided in the first member, and a fourth electrode provided in the second member and facing the third electrode, and
the first actuator and the second actuator change the dimension of the gap by bending the second member toward the first member.

3. The actuator drive apparatus according to claim 2, wherein
the bias voltage is smaller than a maximum bias voltage $V_{b\_max}$ represented by the following Equation (1), $$V_{b\_max} = \sqrt{\frac{2K_1(G_0 - G_t)G_t^2}{ES}} \qquad (1)$$

where a spring coefficient of the second member is $K_1$, a dielectric constant of the gap is E, a target value of a dimension between the first electrode and the second electrode of the first actuator is $G_t$, a dimension between the first electrode and the second electrode is $G_0$ when the first actuator and the second actuator are not driven, and an area of a region where the first electrode and the second electrode overlap when viewed in a direction from the first member toward the second member is S.

4. The actuator drive apparatus according to claim 2, wherein
the first voltage signal output before the lapse of the predetermined time has a signal waveform that is set according to a natural period of the second member and that cancels a natural vibration of the second member.

5. The actuator drive apparatus according to claim 1, wherein
the first member includes a first reflective film in a surface facing the second member, and
the second member includes a second reflective film facing the first reflective film, in a surface facing the first member.

6. A method for controlling an actuator drive apparatus including a first member, a second member that faces the first member via a gap, a gap sensor that detects a dimension of the gap, a first actuator that changes the dimension of the gap through input of a first voltage signal, and a second actuator that changes the dimension of the gap through input of a second voltage signal, the method comprising:
a first voltage application step of applying the first voltage signal to the first actuator; and
a second voltage application step of applying the second voltage signal to the second actuator; wherein
the first voltage signal applied in the first voltage application step is a voltage signal that becomes a constant bias voltage after a lapse of a predetermined time, and includes an overshoot signal larger than the bias voltage before the lapse of the predetermined time, and
the second voltage signal applied in the second voltage application step is a voltage signal that is feedback-controlled so that a detection value detected by the gap sensor approaches a target value.

* * * * *